US010282922B1

(12) United States Patent
Nejah et al.

(10) Patent No.: US 10,282,922 B1
(45) Date of Patent: May 7, 2019

(54) TECHNIQUES FOR DETECTING AND REPORTING A VEHICLE CRASH

(71) Applicant: SunMan Engineering, Inc., San Jose, CA (US)

(72) Inventors: Allen Nejah, San Jose, CA (US); Ehsan Keikha, San Jose, CA (US)

( * ) Notice: Subject to any disclaimer, the term of this patent is extended or adjusted under 35 U.S.C. 154(b) by 0 days.

(21) Appl. No.: 15/081,618

(22) Filed: Mar. 25, 2016

Related U.S. Application Data

(60) Provisional application No. 62/139,439, filed on Mar. 27, 2015.

(51) Int. Cl.

*B60Q 1/00* (2006.01)
*G07C 5/00* (2006.01)
*G08B 25/10* (2006.01)
*G07C 5/08* (2006.01)

(52) U.S. Cl.

CPC ............. *G07C 5/008* (2013.01); *G07C 5/085* (2013.01); *G08B 25/10* (2013.01)

(58) Field of Classification Search

CPC ........ G07C 5/085; G07C 5/008; G08B 25/10; B60Q 1/00

USPC ............... 340/436, 438, 933, 439, 441, 463; 701/32.2

See application file for complete search history.

(56) References Cited

U.S. PATENT DOCUMENTS 5,327,345 A * 7/1994 Nielsen ................. E01C 19/006 172/4.5
5,409,258 A 4/1995 Kawabata
5,977,653 A 11/1999 Schmid et al.
8,548,686 B2 * 10/2013 Pisz ........................ G08G 1/205 180/282
8,935,013 B2 * 1/2015 Wanami ............... G07C 5/0841 340/436
2003/0112133 A1 * 6/2003 Webb ...................... G07C 5/008 340/436
2005/0068174 A1 3/2005 Oesterling et al.
2007/0150140 A1 * 6/2007 Seymour ................ G07C 5/008 701/33.4
2007/0260363 A1 11/2007 Miller
2008/0122603 A1 * 5/2008 Plante .................... B60W 40/08 340/439

(Continued)

OTHER PUBLICATIONS

Thompson et al.; "Using Smartphones to Detect Car Accidents and Provide Situational Awareness to First Responders"; Mobilware 201 0; Jun. 30-Jul. 2, 2010; Chicago, USA.

(Continued)

*Primary Examiner* — Phung Nguyen

(74) *Attorney, Agent, or Firm* — DeWitty and Associates, Chtd.; Robert M. DeWitty

(57) ABSTRACT

Techniques are described for automated vehicle crash detection and prevention. In one exemplary embodiment, information from one or more sensors, e.g., accelerometer and gyroscope, or from event data recorder (EDR) through OBD-II ECU, is received and recorded in a system. The system saves the received information in a memory for later use. The status of the vehicle may be sent to appropriate recipients. For example, a report of vehicle malfunction may be sent, e.g., through 2G/3G communication, to the driver's mobile phone or a maintenance center, and a report of the accident may be sent to an emergency center, police and/or an insurance company.

6 Claims, 3 Drawing Sheets

(56) References Cited

U.S. PATENT DOCUMENTS

| | | | | |
|---|---|---|---|---|
| 2009/0261958 | A1* | 10/2009 | Sundararajan | B60R 21/0132 340/436 |
| 2012/0109447 | A1* | 5/2012 | Yousefi | H04N 7/183 701/32.2 |
| 2012/0123632 | A1 | 5/2012 | Nejah | |
| 2014/0358394 | A1* | 12/2014 | Picciotti | G06F 21/6218 701/70 |
| 2014/0375446 | A1* | 12/2014 | Wanami | G08G 1/205 340/436 |
| 2015/0134142 | A1* | 5/2015 | Taylor | G07C 5/00 701/1 |
| 2015/0279127 | A1* | 10/2015 | Dato | G07C 5/085 701/32.2 |
| 2016/0097224 | A1* | 4/2016 | Fernandez-Aguilera | E05B 77/12 701/45 |

OTHER PUBLICATIONS

Kanamoto, J. et al., "Electronic Crash Sensing Unit for Airbag," in Proc. SAE Paper Ser. 940624, 1994.

Harlow, Charles, and Yu Wang. "Acoustic accident detection system." ITS Journal-Intelligent Transportation Systems Journal 7.1 (2002): 43-56.

Allen, J. L., "Power-Rate Crash Sensing Method for Safety Device Actuation," in Proc. SAE Paper Ser. 920478, 1992.

Jeong, H. Y. and Kim, Y. H., "New algorithm and accelerometer locations for frontal crash discrimination," Proc. ImechE—Part D: J. Automobile Eng., vol. 215, No. 11, pp. 1171-1178, 2001.

* cited by examiner

TECHNIQUES FOR DETECTING AND REPORTING A VEHICLE CRASH

CROSS-REFERENCES TO RELATED APPLICATIONS

This application claims the benefit of U.S. Provisional Patent Application No. 62/139,439, filed Mar. 27, 2015, which is hereby incorporated by reference for all purposes.

TECHNICAL FIELD

The present disclosure relates generally to vehicle monitoring, and in particular, to vehicle crash/collision/accident/impact detection and reporting.

BRIEF DESCRIPTION OF THE DRAWINGS

An understanding of the nature and advantages of various embodiments may be realized by reference to the following figures.

BACKGROUND

Figure 1:
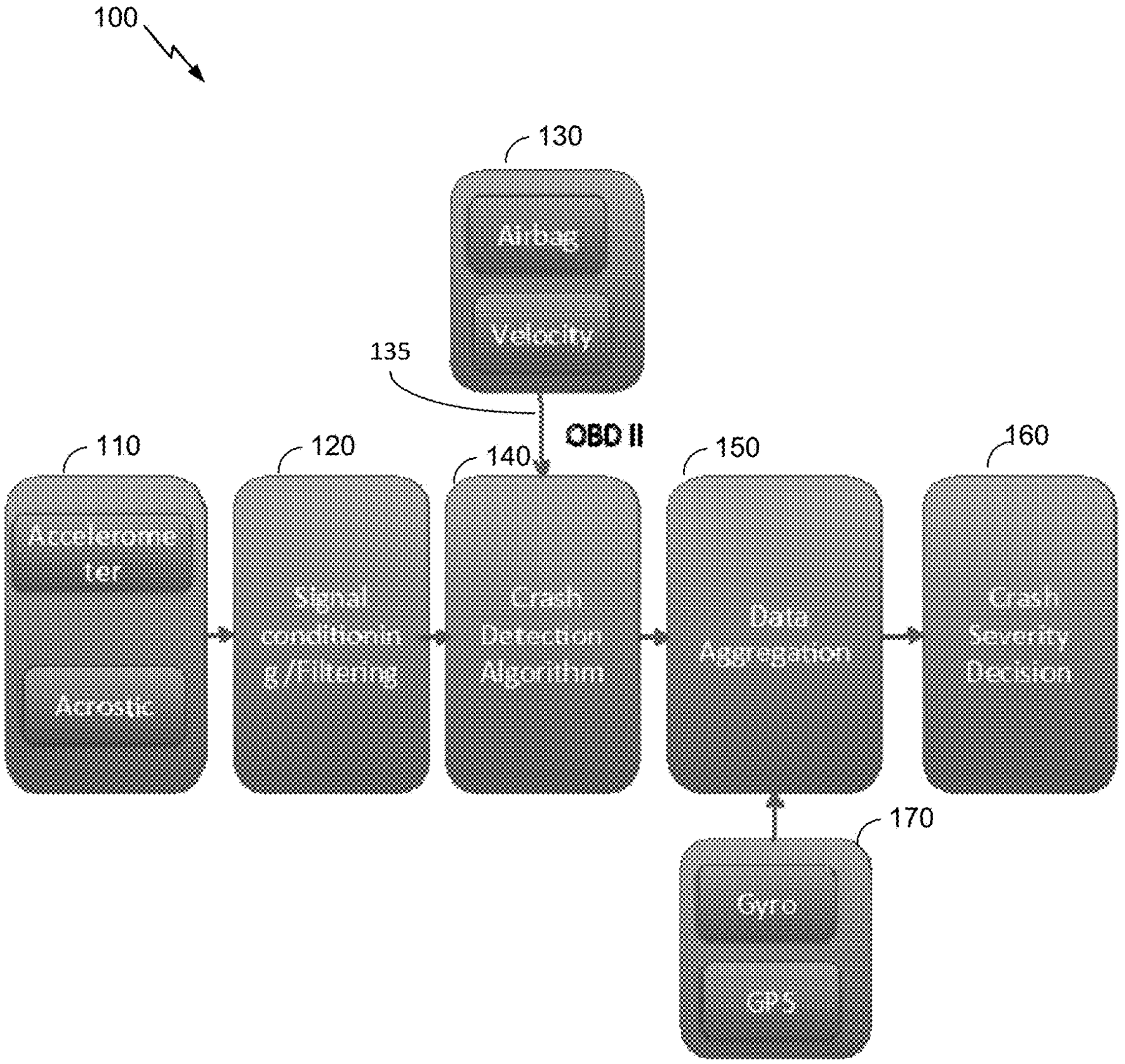
FIG. 1 illustrates an overview of an exemplary Smart Crash Detector (SCD)

Car accidents are a leading cause of death. Automated car accident detection can save lives by decreasing the time required for information to reach emergency responders. It has been shown that most fatalities of car accidents could have been prevented by a faster access to help.

Conventional in-vehicle accident detection systems rely on vehicle on board sensors through direct interaction with the vehicle's electronic control units (ECUs). These sensors detect acceleration/deceleration, airbag deployment, and vehicular rollover. However, this information is not sufficient to accurately detect an accident.

DETAILED DESCRIPTION

Event data recorder (EDR) is a device installed in some automobiles to record information related to vehicle crash or accident, similar to the airplanes' "black box." EDRs are triggered by electronically sensed problems in the engine (often called faults), or a sudden change in wheel speed. One or more of these conditions may occur because of an accident.

Information from a device such as an EDR can be collected after an impact and analyzed to help determine what the vehicle was doing before, during and after the impact or event. A common use of such data is to help identify the party at fault in a car accidents.

Integration of EDR information and SCD (smart crash detector) information may be very useful for help centers such as hospitals, police, emergency responders and the like to learn more facts about the accident and its severity to faster and better respond to the accident and the possible cause of the accident. In addition, although EDR is useful in collecting information about the car condition before and during an accident, older cars normally are not equipped with EDR. So, smart crash detector SCD on an older car can completely or partially cover EDR functionalities for fleet management.

Vehicular Monitoring and Safety Application

In this disclosure, methods and devices for a system that integrates automobile event information and smart crash detector SCD (such as acoustic, accelerometer and gyroscope, GPS and etc.) are presented.

In one embodiment, a smart crash detector (SCD) may be connected to a ODB-II. The SCD can interact with the internal sensors in a car through the standard OBD-II interface. In one variation, in addition to obtaining in-car sensor information, sensors associated with the SCD such as accelerometer and gyro may detect car events such as sudden brake, sudden turning and accidents. During an accident, the SCD will experience the same forces and accelerations experienced by the vehicle passengers. In one embodiment, under normal conditions when the SCD remains stationary relative to the vehicle, the data gathered from the SCD may be used for modeling and analysis of the forces it experiences. In this case, the SCD may function as vehicular ECUs. When a crash happens, the data received by the SCD (i.e., from smart sensors and ECU) may be sent to an emergency center to, for example, provide the accident location, severity and other detailed information about the accident. In one embodiment, the data may be stored in the internal memory of the SCD for future use.

In one embodiment, a vehicular monitoring and safety system may combine several signals from sensors comprising acceleration, acoustic, airbag, velocity, gyroscope, GPS and/or the like to achieve a symbiosis between them to improve the effectiveness of emergency services by making accident detection fully automated.

Figure 2A:
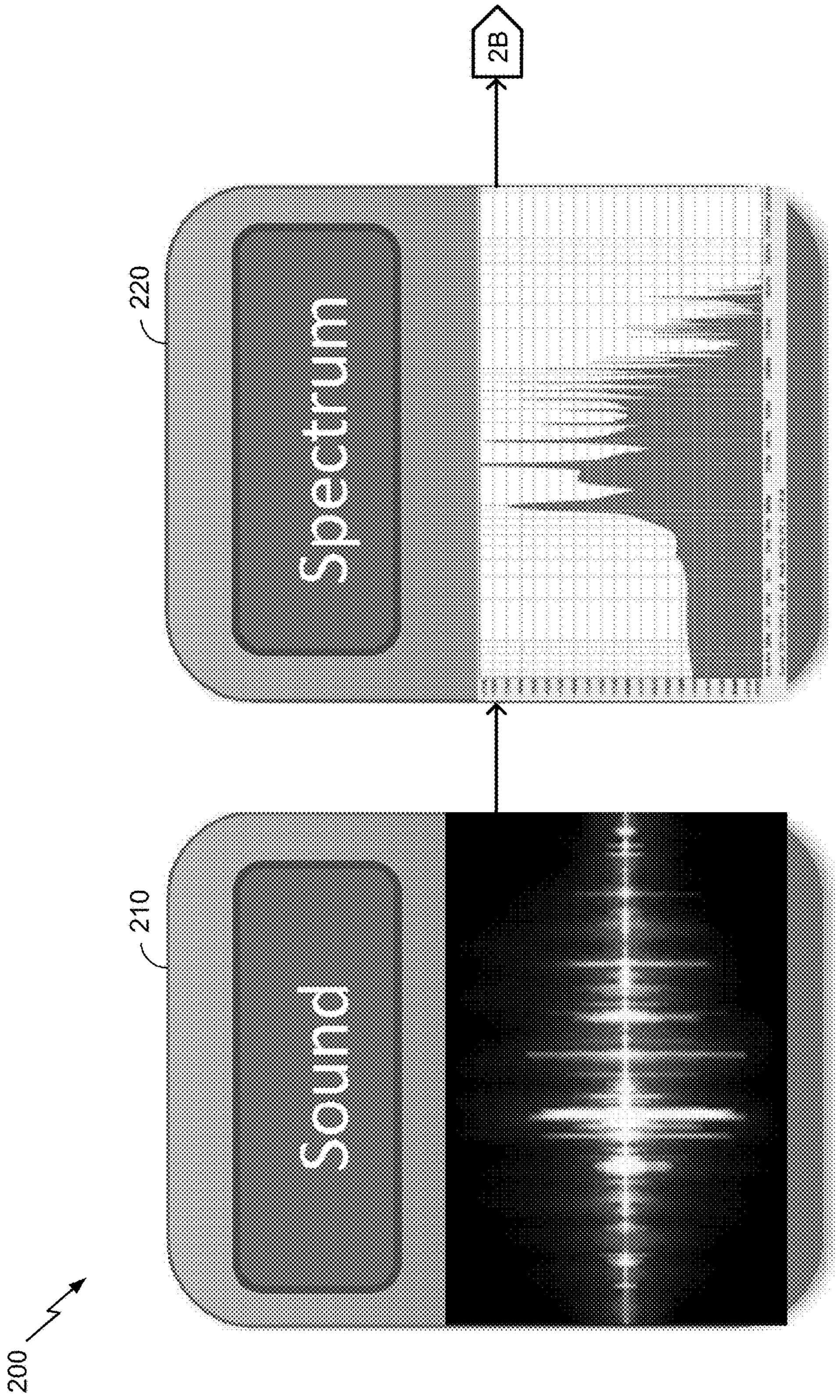
FIG. 2A and FIG. 2B illustrate an overview of an exemplary condition recognition process.
Figure 2B:
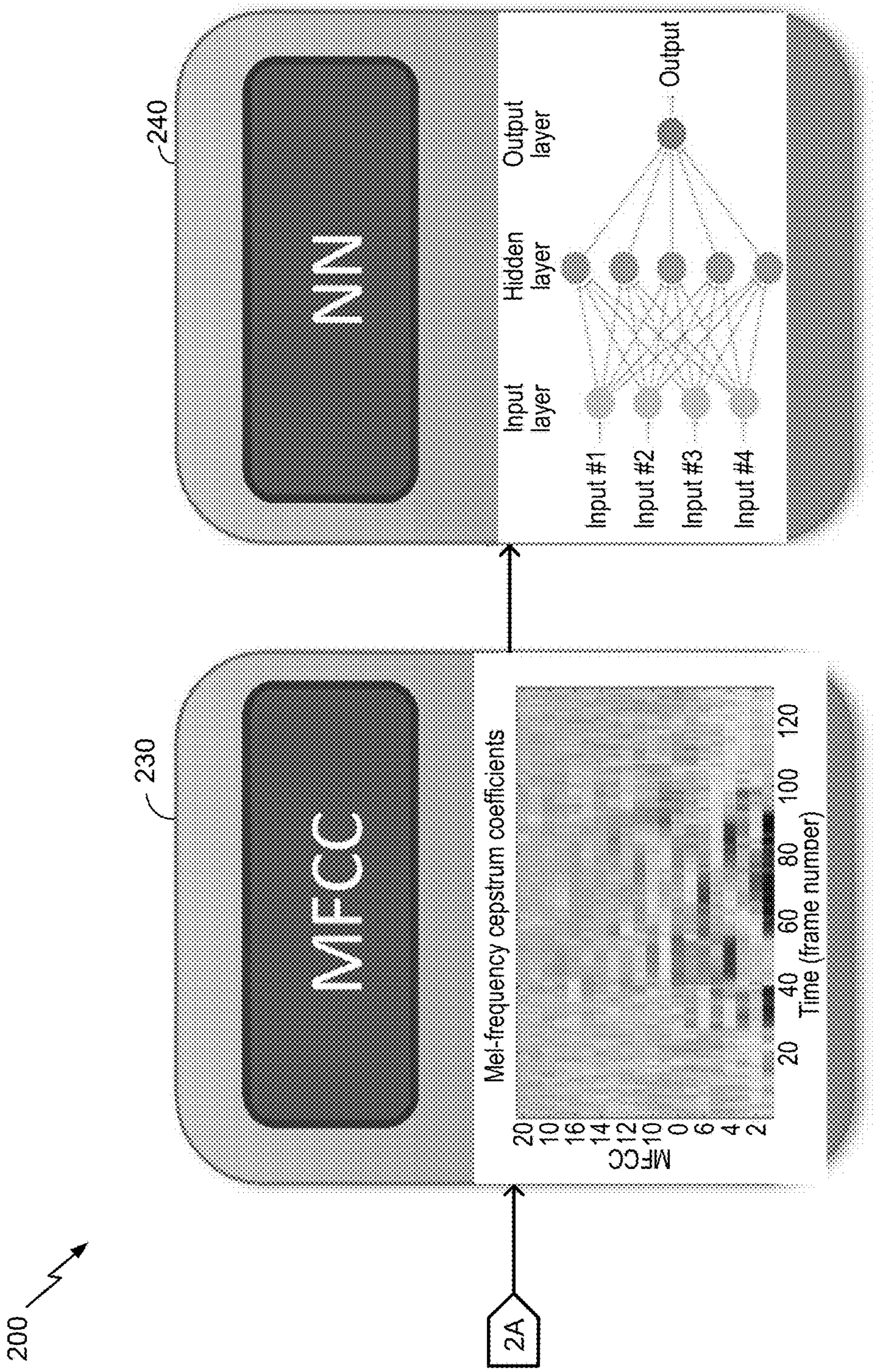

Thus, in the exemplary embodiment of a vehicular monitoring and safety system shown in FIG. 1, three sets of data may be received by a Smart Crash Detector (SCD) to be used in the SCD algorithm to assess the crash severity and other accident related information. A first set of data 110 that includes accelerometer and acoustic data, may be received from the sensors as part of the SCD installed in the vehicle. In block 120, the signals corresponding to the first set of data 110 are processed, e.g. filtered and analyzed using techniques, an example of which is described further below with reference to FIGS. 2A-2B. A second set of data 130 from vehicle's built-in sensors, including Air bag and Velocity sensors, is accessible via vehicle's OBD-II connection 135. Data set 130 aggregated with the processed signal from block 120 are fed to the SCD processor. SCD processor runs a crash detection algorithm 140 on the data sets 110 and 130 to detect signs of crash. A crash may be detected, however, detection of the severity of the crash is also important for decision making purposes. A third data set 170 that includes Gyroscope and GPS data, which shows three dimensional changes in the vehicle position such as rollover, may be used to determine the severity of a crash. Data from crash detection algorithm 140 and third data set 170 is aggregated and processed at data aggregation block 150, from which the crash severity is determined at block 160. In a further embodiment, information from other sensors related to the passenger such as health status or mobile information may be sent to SCD, to be used for a more detailed crash severity detection or for fleet management.

In one embodiment, the crash detection decision may be packed and sent to emergency service databases or to other third parties defined by the user through technologies such as Bluetooth, Wi-Fi, 802.11P, 2G, 3G or 4G and the like. This procedure may be followed by an automatic call to an operator, which may take action such as sending rescue services to the accident location.

In one embodiment, general purpose information may be offered to the driver, including gas levels, detection of failures in mechanical elements, extensive engine feedback data, full fleet management functions and capabilities, and the like.

In one embodiment, G-forces may be detected on the vehicle in three axes x, y and z (fore and aft, lateral and vertical, respectively) using an accelerometer array. In another embodiment, acoustic waves transmitted through the body of the vehicle may be detected by an acoustic sensor. In yet another embodiment, rotation of the vehicle in three axes x, y and z may be detected using a gyroscope.

Certain embodiments may use Smart Crash Detector (SCD) in which the different methods independently or in combination may be used for detection of accidents.

In one embodiment, when vehicles are involved in a significant crash (e.g., a metal is bent or a personal injury has occurred), G-forces generated by the impact are easily measureable. In one embodiment, in conditions such as bad driving (e.g., curbing a front wheel at the approach to a roundabout) or bad road surfaces (e.g., potholes) which can create forces similar to a minor crash, use of acceleration information alone may cause false alerts. On the other hand, setting the G-force thresholds to a low level may result in false reports, and setting the limits higher may result in failure to detect some accidents. Therefore, other sensor data such as acoustic data may be needed to provide more precise detection of conditions. In another embodiment, acoustic components can be used to prevent false alerts as a result of speed bumps, which may generate a vertical acceleration of around 3G.

In one embodiment, a crash may be detected using specific threshold levels of acoustic and G-force sensors. The information received from the gyroscope may help further detection of the severity of the crash.

In one embodiment, the three methods, normal G-force measurement by accelerometers, the acoustic waves, and gyroscope signal may be used at the time of the impact to detect and confirm a crash. A crash event may be reported when all three measurements simultaneously pass pre-defined levels.

In one embodiment, a low speed crash generates a small acceleration and a measurable G force which are combined with an acoustic signature. The detection threshold can be set low in order to identify only the G-force. In one embodiment, the threshold levels may be determined intelligently by a software. In one embodiment, time duration of an impact may be considered in determining a threshold level. In one embodiment, time duration and strength of an impact may be considered for determining a threshold level. In one embodiment, a test and sampling process for calibration of the threshold may be provided. In one embodiment, sensors may learn the orientation of the unit (front, back and the like) and align with the x, y and z axes of the vehicle automatically. In one embodiment, acoustic sensing associated with structure borne waves may be used for acoustic calibration to make the detection insensitive to the regular noises of a vehicle. In one embodiment, the levels may be adjusted for a specific usage, e.g., loud music or kids' noise to prevent wrong trigger of the system.

Acoustic Crash Detection Algorithm

Certain embodiments may use acoustic signals to detect a car condition. An acoustic signal conditioning algorithm may be used in signal conditioning/filtering block 120 (FIG. 1) in the SCD. In one embodiment depicted in FIGS. 2A-2B, four steps in processing sound signal 210 may be carried out. In step 220, a processor digitizes the sound events to be classified. In step 230, a Mel Frequency Cepstral Coefficients (MFCC), which represents the spectral-domain content of the sound, may be calculated over small time frames. In step 240, a feed forward neural network may classify the features into categories of crash and non-crash at each frame, and in another step, a final decision may be used to match the neural network output to the target output.

Acceleration Crash Detection Algorithm

In one embodiment, an acceleration crash detection algorithm may be used in crash detection algorithm block 140 (FIG. 1). An acceleration crash detection algorithm 140 may categorize the after impact information received from various sensors to three groups including input variables related to crash force, input variables related to impact energy, and input variables related to the combination of force and energy. In one embodiment, status of a vehicle may be estimated based on the groups of information with the following main measurements:

acceleration: $a(t)$;

sum of absolute acceleration: $\Sigma|a(t)|$;

velocity: $v(t)=\Sigma a(t)$;

rate of velocity change: $a(t)|_{4sample}=(v(t)-v(t-4)/4\cdot Ts)$;

rate of change of the velocity change rate: $da(t)|_{(4samples)}/dt$;

acceleration differential: $j(t)\approx(da(t)/dt)$;

sum of acceleration signal length:

$$\Sigma\sqrt{\left(\frac{da(t)}{dt}\right)^2+1};$$

In one embodiment, the sum of absolute acceleration, velocity, and the rate of velocity change may be used as signals for discerning an impact type, whereas velocity and the rate of velocity change may be used for impact detection. The sum of acceleration length may be used to determine whether the impact is identified.

The embodiments disclosed herein are not to be limited in scope by the specific embodiments described herein. Various modifications of the embodiments of the present invention, in addition to those described herein, will be apparent to those of ordinary skill in the art from the foregoing description and accompanying drawings. Further, although some of the embodiments of the present invention have been described in the context of a particular implementation in a particular environment for a particular purpose, those of ordinary skill in the art will recognize that its usefulness is not limited thereto and that the embodiments of the present invention can be beneficially implemented in any number of environments for any number of purposes.

What is claimed is:

1. A method for vehicle crash identification, the method comprising:

using acoustic sensing associate with structural borne waves for acoustic calibration;

receiving a first set of data from a first set of sensors installed in a vehicle;

recording the first set of data;

receiving a second set of data from said vehicle built-in sensors;

determining a status of the vehicle using the first set of data and said second set of data associated with a previous status of the vehicle through the detection of acoustic waves transmitted through the body of the vehicle; and transmitting a third set of data associated with the three-dimensional changes in the vehicle position to one or more devices associated with the vehicle; wherein determining said status of said vehicle occurs through classifying said first set of data into the categories of a crash or a non-crash via a feed forward neural network.

2. The method of claim 1, wherein the first set of sensors are associated with On-Board Diagnostics.

3. The method of claim 1, wherein the first set of sensors are associated with Event Data Recorder (EDR).

4. The method of claim 1, wherein the first set of data comprises gas levels, detection of failures in mechanical elements of the vehicle, engine feedback data, and full fleet functions and capabilities.

5. The method of claim 1, wherein the third set of data is derived from a gyroscope, and determining a status of the vehicle further comprises:

detecting rotation of the vehicle in three axis x, y and z using a gyroscope.

6. The method of claim 1, wherein the first set of data is derived from an accelerometer array, and determining the status of the vehicle further comprises:

detecting G-forces acting on the vehicle along three axes x, y and z using an accelerometer array.

* * * * *